United States Patent
Honkawa et al.

[19]

[11] Patent Number: 6,145,245
[45] Date of Patent: *Nov. 14, 2000

[54] FLORAL BOUQUET AND KEEPSAKE ASSEMBLY

[75] Inventors: Bryan K. Honkawa, Malibu; Edward Mayer, Los Angeles, both of Calif.

[73] Assignee: Teleflora LLC, Los Angeles, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/052,357

[22] Filed: Mar. 31, 1998

[51] Int. Cl.$^7$ .................................................. A01G 5/00
[52] U.S. Cl. ........................................................ 47/41.01
[58] Field of Search ............................... 47/41.01, 41.11, 47/41.12, 41.13, 66.6, 41.15

[56] References Cited

U.S. PATENT DOCUMENTS

| | | | |
|---|---|---|---|
| 18,606 | 11/1857 | Spratt | 431/297 |
| D. 73,280 | 8/1927 | Coble | D11/147 |
| 585,486 | 6/1897 | Snow | 47/41.01 |
| 779,924 | 1/1905 | Gommel | 47/41.01 |
| 903,227 | 11/1908 | Pruden | 47/41.13 |
| 1,631,631 | 6/1927 | Gerlinger | 431/126 |
| 1,645,577 | 10/1927 | Bennett | 47/41.13 |
| 1,694,214 | 12/1928 | Ginder | 47/41.01 |
| 2,187,450 | 1/1940 | Gebs | 47/41.13 |
| 2,332,352 | 10/1943 | Smith | 47/41.13 |
| 2,639,552 | 5/1953 | Tredup | 47/41.13 |
| 2,686,989 | 8/1954 | Dillon et al. | 47/41.13 |
| 2,734,312 | 2/1956 | Vaghi | 47/41.01 |
| 2,747,393 | 5/1956 | Thorn | 431/289 |
| 2,876,587 | 3/1959 | Saks et al. | 47/41.11 |
| 2,929,171 | 3/1960 | Josephson | 47/41.13 |
| 4,521,990 | 6/1985 | Murray | 47/41.12 |
| 5,309,670 | 5/1994 | Bates | 47/71 |

FOREIGN PATENT DOCUMENTS

| | | | |
|---|---|---|---|
| 966743 | 10/1950 | France | 47/41 |
| 18577 | 8/1906 | United Kingdom | 47/41 |
| 23881 | 8/1911 | United Kingdom | 47/41.11 |

*Primary Examiner*—Charles T. Jordan
*Assistant Examiner*—Fredrick T. French, III
*Attorney, Agent, or Firm*—Pretty, Schroeder & Poplawski, P.C.

[57] ABSTRACT

A universal floral bouquet assembly secures a keepsake to a floral bouquet arrangement. In particular, a container is provided having an upright probe projecting vertically from the center of the container. Floral foam that receives a bouquet of flowers is pressed into and through the probe. A receptacle associated with the keepsake frictionally engages the opposite end of the probe to securely support the keepsake above the floral arrangement. The receptacle may be integral to the base of the keepsake or may be a component of a transition piece, called an intermediate support, upon which the keepsake, such as a cylindrical candle, is secured. The supporting components are inexpensive to manufacture and ship, simple to assemble, provide firm support for the assembled arrangement during its transportation, and are small and unobtrusive, resulting in an aesthetically pleasing, but inexpensive floral/bouquet arrangement. The components are also reusable for those applications that require this feature.

1 Claim, 7 Drawing Sheets

FLORAL BOUQUET AND KEEPSAKE ASSEMBLY

FIELD OF THE INVENTION

This invention relates to the field of floral containers and, more particularly, to a system that secures one of a variety of keepsakes to a floral bouquet arrangement.

BACKGROUND OF THE INVENTION

Floral bouquets arranged with nonperishable gift items or keepsakes have become popular gift items. For example, flowers are often arranged and sold together with candles and their holders, statuettes, glass and ceramic jars, memorabilia and a host of other reusable items. Such arrangements typically include a container having floral foam into which the flowers of the bouquet are inserted, and a supporting structure, for securing the keepsake to the floral arrangement.

When designing these types of arrangements, numerous features are desirable. First, when fully assembled, the arrangements should serve as attractive displays for the retail shops where they are sold as well as in the print and video media in which they are advertised. Accordingly, the flowers and keepsake should be prominently displayed, while the structures supporting them should be small, unobtrusive and, to the extent possible, hidden from view.

Second, the arrangements should be very simple to assemble. This feature translates to a reduction in both assembly and assembly training time, factors of particular importance in high volume and highly cost sensitive retail operations. Further, since assembly is often conducted by minimally skilled florists' assistants, minimizing the number and complexity of assembly steps and potential for mistakes is obviously desirable.

Third, the components of such a system should be universally applicable to the numerous types of keepsake arrangements that are available from a manufacturer. Designing such components minimizes the total number of different components needed to support a particular line of products, resulting in several cost-saving benefits to the manufacturer, including reduced design time, part number tracking, manufacturing runs, and inventory costs, to name a few. This, in turn, reduces the costs to the retailers and, ultimately, the consumers.

Fourth, such bouquet/keepsake assemblies can take up a relatively large volume of space, which, of course, impacts shipping costs to the retail flower shops, especially for those shops that purchase in high volume. Thus, minimizing the shipping volume would be highly desirable.

Finally, floral arrangements en route to their final destinations are often subject to less than ideal delivery conditions, such as improper loading into delivery vehicles and careless driving. This fact leads to the potential for inadvertent disassembly of these arrangements due to their tipping over or bumping into neighboring arrangements or other objects. Therefore, the assembled product must be sufficiently secured together to remain in tact during transportation to its final destination.

Currently, several designs combine floral bouquets with keepsakes. U.S. Pat. No. 4,521,990, to Murray, is one example. This invention addressed the problems of arranging and securing a lid of a decorative container that supports a floral bouquet. In particular, a removable retainer, or pick, secures the lid at one end, and is inserted into the body of stalk supporting material at the other end in the same way as the flower stalks are inserted. This solution has proved to be very successful for its intended purpose. However, this invention is limited to solving the particular problems attendant supporting with a two-piece keepsake, such as a container and lid, in a floral display. However, it does not address the problems attendant with other types of keepsakes, in particular singular, large and heavy gift items such as large candles or ceramic figures, because such retainers and florist foam could not support such large items.

U.S. Pat. No. 903,227, to Pruden, also discloses an arrangement for supporting a keepsake above a floral display residing in a container. This invention provides a solution for supporting a particular type of keepsake, namely a candle, above a floral bouquet. However, the keepsake is designed to remain in the supporting structure, which is actually a candelabrum, after the floral bouquet has lived out its useful life. Thus, the entire supporting structure is actually part of the keepsake. Further, this invention does not address the needs described above, and in particular, the goal of having a single versatile system for securely and economically supporting a myriad of keepsake arrangements.

Other designs suffer from one or more of the aforementioned shortcomings. Some are relatively difficult and/or time-consuming to assemble, others are not sufficiently sturdy when assembled to ensure that they will remain intact upon delivery, still other assemblies are too costly for high volume sales and marketing, and some take up large amounts of space when shipping from the manufacturer. In sum, none of the existing designs offer a single, cost effective product that meets all of the above-discussed criteria. Meeting these criteria is made even more challenging when the keepsake to be supported is a relatively heavy gift item, such as a large candle or solid statuette.

Accordingly, there has existed a definite need for a simple, secure, versatile and, economical floral bouquet/keepsake system that is aesthetically pleasing to the customer and gift recipient. The present invention satisfies this need and provides further related advantages.

SUMMARY OF THE INVENTION

The present invention provides a floral bouquet assembly for displaying a bouquet of flowers together with a keepsake that is quickly and easily assembled. The assembly includes an open container having a bottom wall and a peripheral wall, a body of stalk supporting material, such as a layer of floral foam, placed within the container into which the stalks of the flowers penetrate, a probe having a one end connected to the container bottom wall, an opposite end, an upper region, and an elongate support extending upwardly from the one end, through and above the layer of foam, to the opposite end, and a receptacle which defines a downwardly open and generally vertical hole. The upper region releasably mates with any one of a variety of receptacles and is secured to the receptacle via a frictional force. The receptacle is associated with one of a variety of keepsakes which can be secured to the assembly. In this way, only one container design and one probe design need be manufactured for a variety of receptacles which support any number of keepsakes.

More particularly, the connection of the receptacle to the keepsakes can occur in any of a variety of ways. However, these ways generally divide into two categories: (1) keepsakes to be directly secured to the probe by designing into the base of the keepsakes an integral receptacle, and (2) those that require a separate intermediate support having a receptacle. Ceramic keepsakes and other relatively large precast items might fall into the first category. Large cylindrical candles, glass cups and holders, or other items into which the design of an integral receptacle would be difficult, impossible or impractical, tend to require separate intermediate keepsake supports. Nonetheless, regardless of the particular keepsake/receptacle design to be used, the single container and probe design of the present invention suitably supports all of them.

Further, the intermediate support of the present invention is further designed to enhance the aesthetic appeal of the floral arrangement by minimizing its visual presence. It is relatively small and unobtrusive and may be hidden from view by the flowers that surround it.

In a more particular embodiment of the present invention, the upper region of the probe has at least one vertical slot for permitting a compression force to obtain when pressing the receptacle thereon during assembly. This provides the dual benefits of permitting receptacles of various inner diameters to be secured to the probe. Further, the radially outward force opposing the compression of the upper region adds to the frictional force between the probe and receptacle, thus providing additional security to the assembly.

For keepsakes with integral receptacles and keepsake assemblies that require larger diameter receptacles than the standard probe can securely accept, the present invention provides for an adaptor cap which securely fits onto the upper region of the probe. In this way, an even greater range of receptacle inner diameters can be accommodated with a single probe design.

In a further embodiment, the containers of multiple assemblies are nestable. This is accomplished by providing a container into which a probe is releasably engageable. In particular, the container has a latching mechanism formed in or applied to the bottom wall into which the one end of the probe snaps. Thus, when shipping a large number of assemblies to one location, the containers and mating probes are packaged in a disassembled state and the containers are stacked or nested one into another. In this way, the overall size and number of shipping containers can be reduced thus minimizing handling costs. When a shipment of assemblies arrives at a florist shop to be assembled, the one end of each probe may be quickly and securely snapped into the latching mechanism.

Thus, in the preferred embodiment, the assembly has few components: a container, a probe designed to latch into the bottom wall of the container, florists' foam, and a keepsake with either an integral receptacle or an intermediate support. Thus, to assemble the entire product, the assembler first simply snaps the probe into the container's bottom wall, presses a block of floral foam over and through the probe, and then presses the keepsake or the intermediate keepsake support onto the upper region of the probe. The assembly is then ready to receive the flowers into the foam and, if applicable, the keepsake into the keepsake assembly.

The frictional fittings of the one end of the probe into the container and the upper region (or cap covering the upper region) into the receptacle provides a floral bouquet/keepsake arrangement that is inexpensive to manufacture and ship, simple to assemble, even for minimally skilled laborers, and secure enough for safely transporting the arrangements to their final destinations.

Finally, after the bouquet of flowers has lived out its useful life, the keepsake may be easily removed from the bouquet assembly and, if desired, the remaining components, namely the container, floral foam, flowers and retention assembly, if applicable, may be discarded.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENT

The invention summarized above and defined by the enumerated claims may be better understood by referring to the following detailed description, which should be read in conjunction with the accompanying drawings. This detailed description of particular preferred embodiments, set out below to enable one to build and use particular implementations of the invention, is not intended to limit the enumerated claims, but to serve as particular examples thereof. The particular examples set out below are preferred specific implementations of a floral bouquet and keepsake assembly, namely, one with a container, a probe extending from the container, a body of stalk supporting material, and a receptacle for attaching a keepsake thereto. The invention, however, may also be applied to other types and shapes of assemblies and keepsakes.

Figure 1:
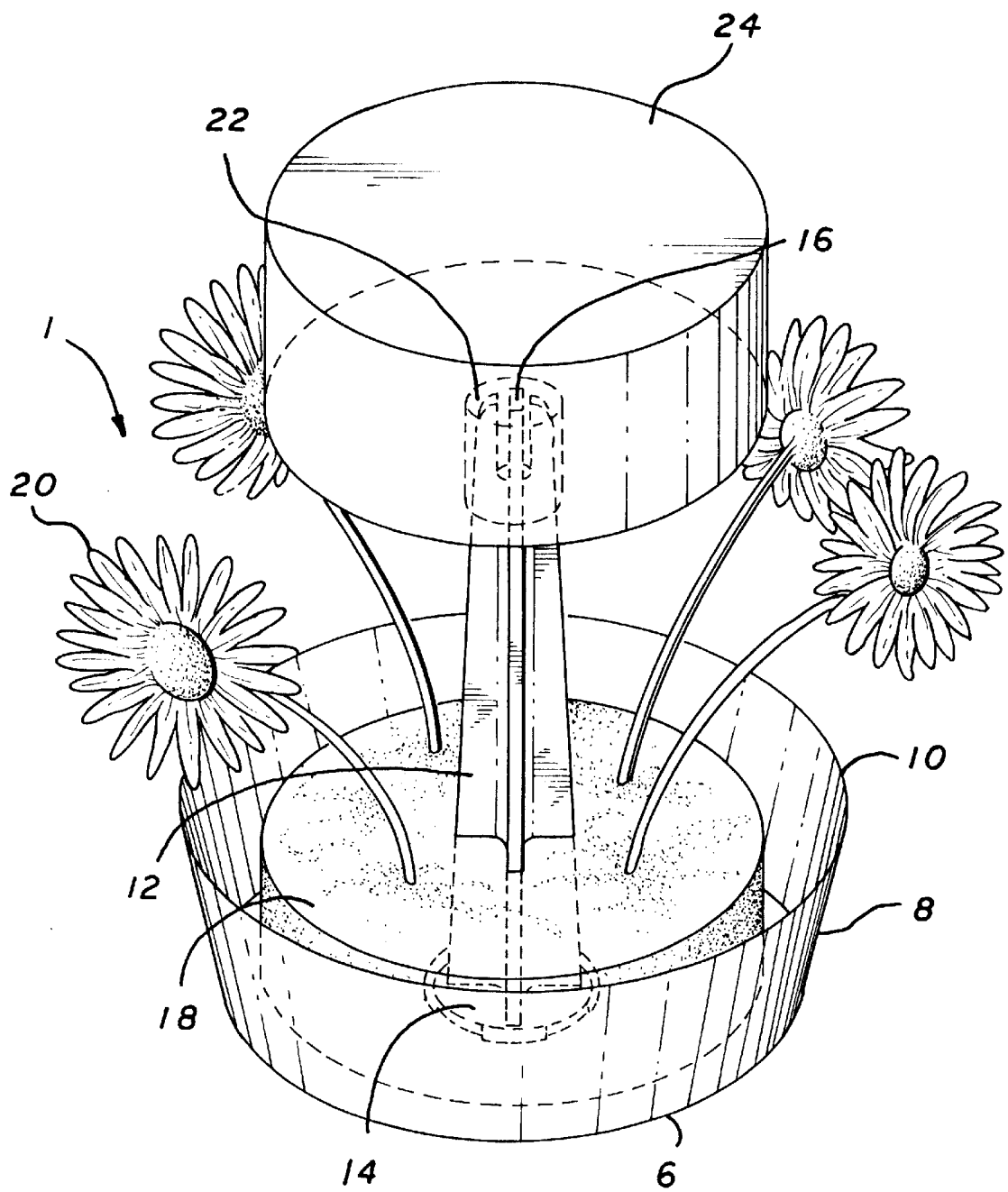
FIG. 1 is a perspective view of the floral bouquet and keepsake arrangement of the present invention.

FIG. 1 shows the basic components of the floral bouquet and keepsake assembly 1 of the present invention. The assembly 1 includes a container 10 having a bottom wall 6 and a peripheral wall 8, an upright probe 12, or supporting means, having one end 14 and an opposite end 16, a body of stalk supporting material 18 extending through the probe 12, a floral bouquet 20 extending into the foam, and a keepsake 24, denoted by a box, secured to the probe 12 via a receptacle 22. The one end 14 of the upright probe 12 extends from the approximate center of the bottom wall 6 of the container 10.

The container 10, or containing means, includes any type of suitable container for supporting stalk supporting material, flowers and keepsakes. Thus, it can take a variety of shapes, such as round, square, oval, or other suitable shape, sizes and may be constructed of a variety of materials, including natural or synthetic material, most preferably plastics. The probe 12, or supporting means, can similarly be made of a variety of suitable shapes, sizes and materials. The stalk supporting material 18 can absorb and retain water while firmly supporting the flowers. In the preferred embodiment, the stalk supporting material is known as floral foam, a product commonly used by florists and available from numerous sources. One such suitable product is available under the trademark OASIS®.

The term keepsake, as currently used in the floral industry to which this invention is related, denotes a gift item that is delivered as part of a floral display to the recipient. Some keepsakes are independently useful items when the bouquet of flowers has lived out its useful life, others are simply adornments, and others are a combination of both. Some keepsakes are structures having a flat base while others have one or more connecting components related to the floral display, such as a receptacle, integrally designed into the bottom of the keepsake. Examples of keepsakes having utility might be candles, lamps, vases, etc. Decorative keepsakes might include figurines, such as ceramic dolls or religious votives. It is understood, however, that keepsakes as used herein, are not limited to these enumerated types of gift items but are merely exemplary.

Figure 2:
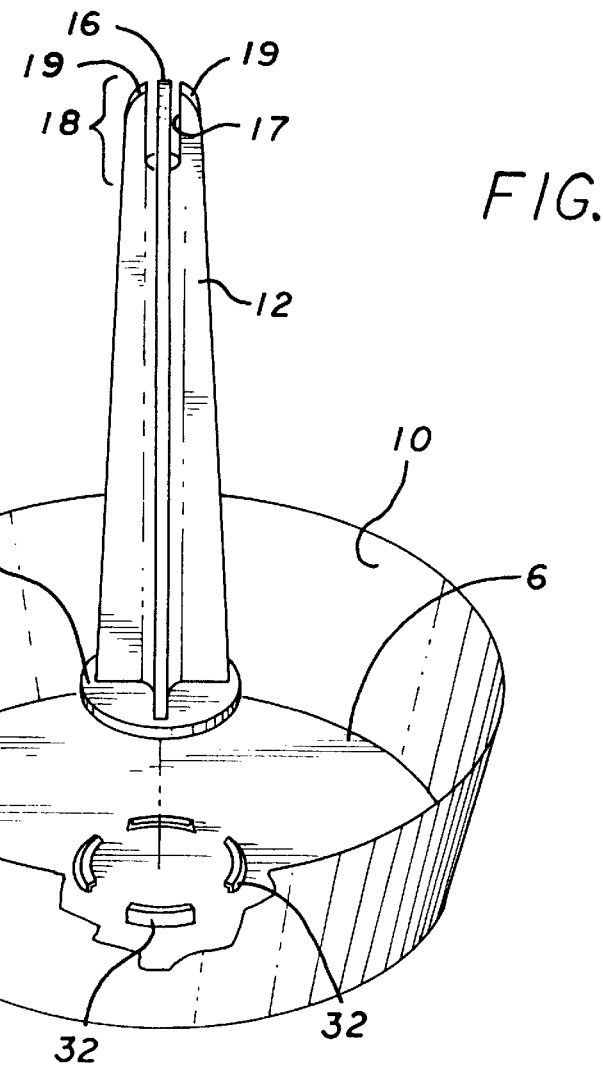
FIG. 2 is an exploded perspective view one embodiment of the floral container and probe of the present invention.
Figure 2A:
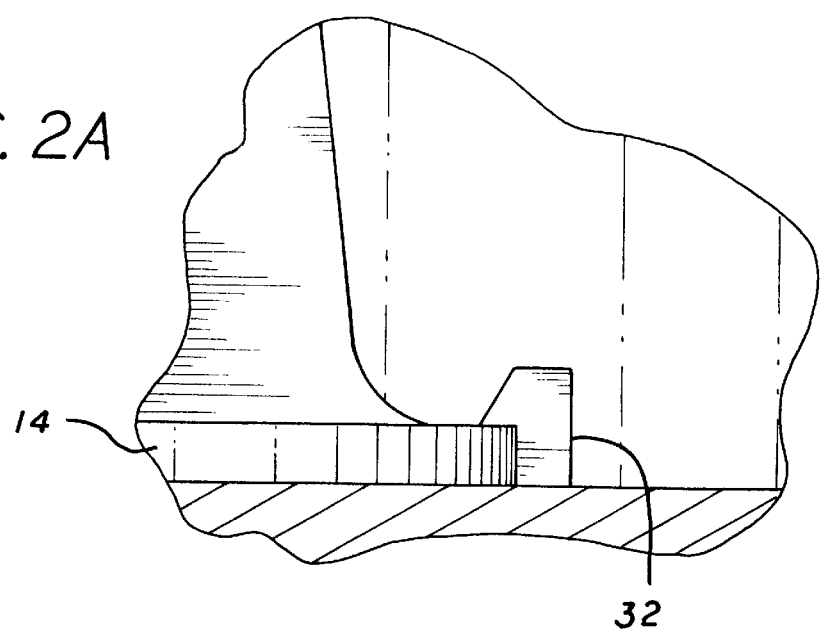
FIG. 2A is a cross-sectional view of the floral container detailing the latching mechanism.

As shown in FIG. 2, the container 10 and the probe 12 are not integral. Rather, the bottom wall 6 of the container 10 contains a latching mechanism 32 defining an interior space substantially equal to the circumference of the one end 14 of the probe 12 in order to releasably connect the two components together. FIG. 2A shows one embodiment of the latching mechanism. In particular, the one end 14 of the probe 12 comprises a substantially round disk. The container bottom wall 6 includes notches 32 that are ratcheted in a downward orientation so that the one end 14 of the probe 12 may snap into the interior space, and the probe 12 is secured in place and can be removed only with considerable force.

Figure 2B:
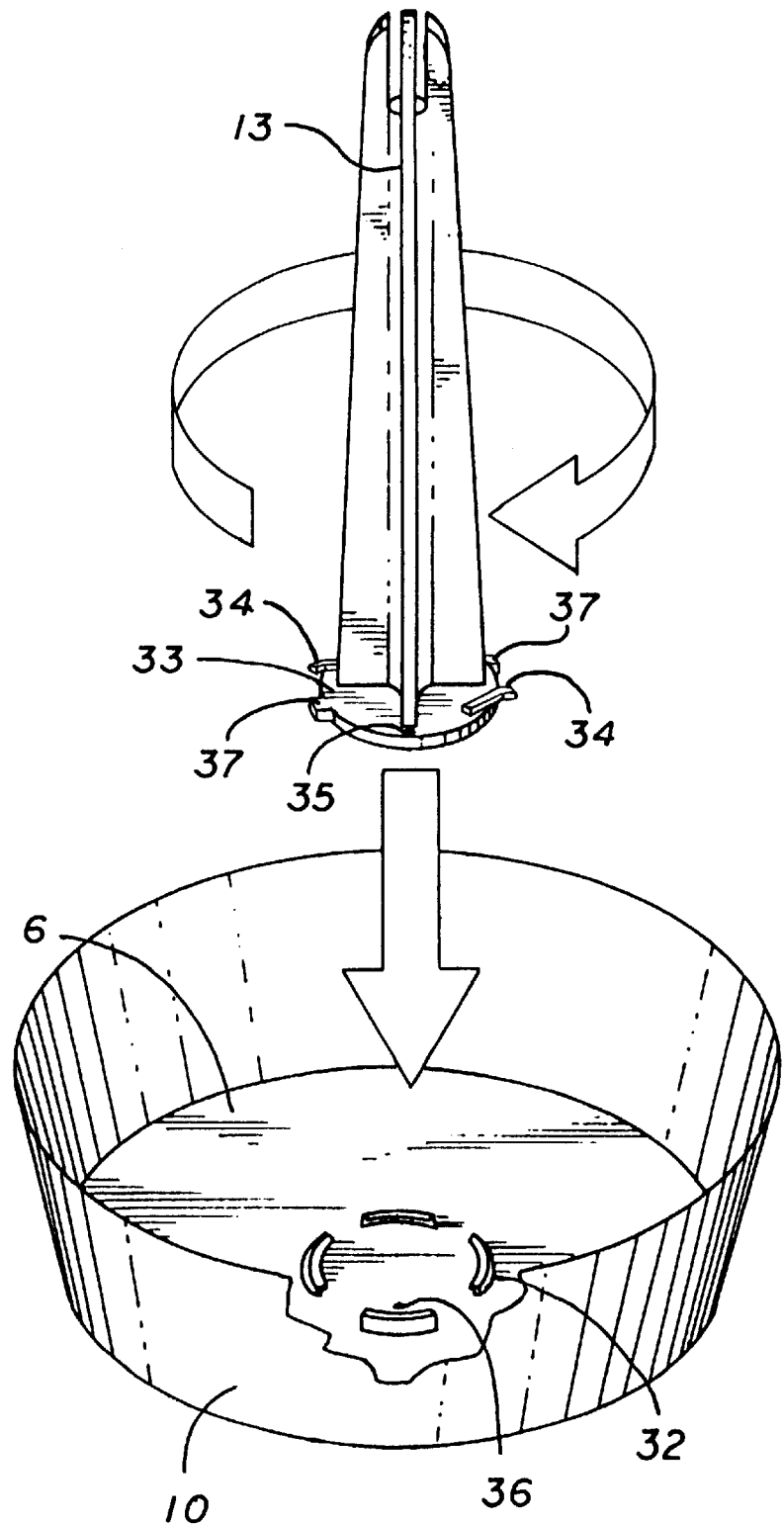
FIG. 2B is an exploded perspective view of another embodiment of the probe and container with an alternative latching mechanism.

In the alternative embodiment shown in FIG. 2B, a twist locking design is used as the latching mechanism. In particular, the one end 33 of the probe 13 is designed with two diametrically opposed "fingers" 34, two tabs 37 and an alignment dot 35. The container bottom wall 6 is designed with notches 32 and a mating alignment dot 36. When assembling the two components, the assembler aligns the two dots 35 and 36 and rotates the probe 13 clockwise. The fingers 34 are slightly compressed by the vertical walls of the two notches 32 across which they horizontally traverse. When the fingers complete their travel across the notches and past their trailing edges, they snap radially outward. Concurrently, the rigid tabs 37 abut against the leading edges of the notches 32, thus preventing further rotation. In this way, each of two opposing notches 32 is secured by a finger 34 at one edge and a tab 37 at the other.

These designs provide the benefits of simple and fast assembly, while being very secure when fully assembled. It is understood, however, that other ways of temporarily but securely latching the one end of the probe to the container bottom wall are acceptable, including the use of adhesive, Velcro®, and another known mechanical latching system.

Figure 3:
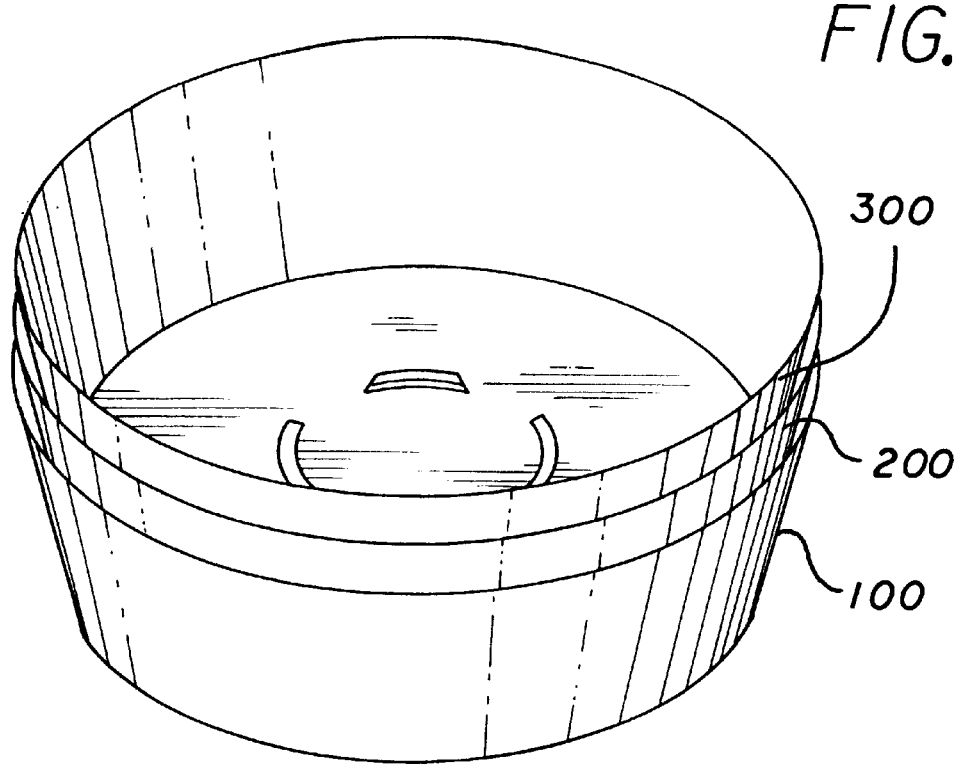
FIG. 3 is an illustration of a plurality of floral containers nested together.

The non-integral, snap-in container and probe design, or container-probe kit, permits the manufacturer and the retailer to obtain an economy of storage and shipping volume. As shown in FIG. 3, each container of each assembly of the present invention is nestable into one another when the probes are not attached. FIG. 3 illustrates three such containers 100, 200, and 300 nested into one another. Accordingly, a shipment of many sets of floral bouquets assemblies of the present invention from the manufacturer to a single retail floral shop takes a fraction of the space that would otherwise be needed were the container 10 and probe 12 integral. This design permits simple and rapid packaging and results in reduced shipping costs and reduces the storage space needed when not in use.

Referring back to FIG. 2, the upright probe 12 has a generally conical shape, tapering from the one end 14 to an upper region 18 and terminating in an opposite end 16. It is understood, however, that other shapes, sizes and materials that can support floral foam and a keepsake assembly may be employed. In this preferred embodiment, the probe 12 also includes four vertical slots 17 extending downward from the opposite end 16 into the upper region 18. In one preferred embodiment the slots 17 extend for approximately 0.5 inches. The slots 17 create four individual spikes 19 which, when inserted into a receptacle (not shown) during assembly, are compressed toward each other, thereby creating a radially outward force against the interior of the receptacle. This adds to the frictional force engaging the two members and provides for a more secure assembly. The compressible spikes 19 also permit the use of a limited variety of sizes of receptacles that can mate with the probe 12.

Figure 4:
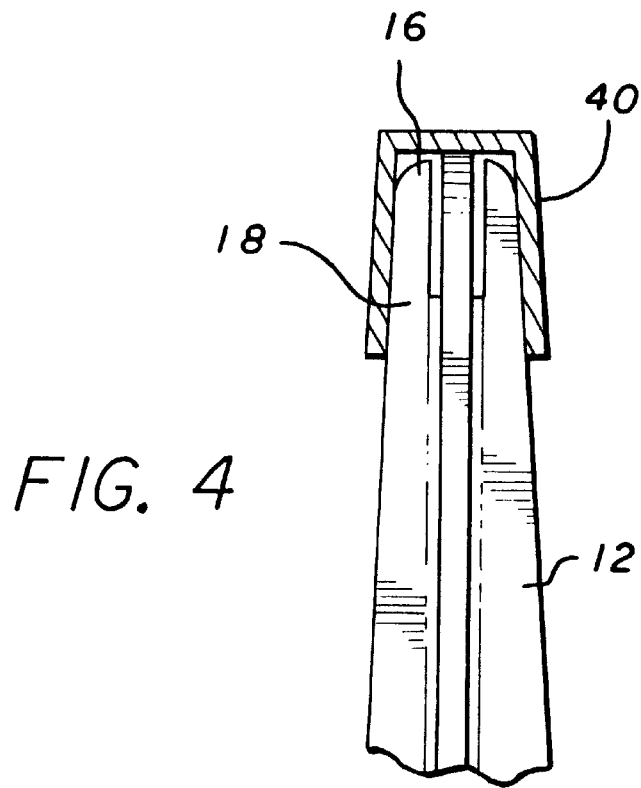
FIG. 4 is a side elevational view of the probe shown in FIG. 2 with an adaptor cap.

As shown in FIG. 4, in order to add further versatility to the bouquet assembly, an adaptor cap 40 may be provided. This cap can be pressed onto the upper region 18 of the probe 12 in order to increase the diametric footprint of the opposite end 16 and region 18, thus adapting the probe 12 to mate with a receptacle having a larger inner diameter than could be accommodated without such a cap.

Figure 5:
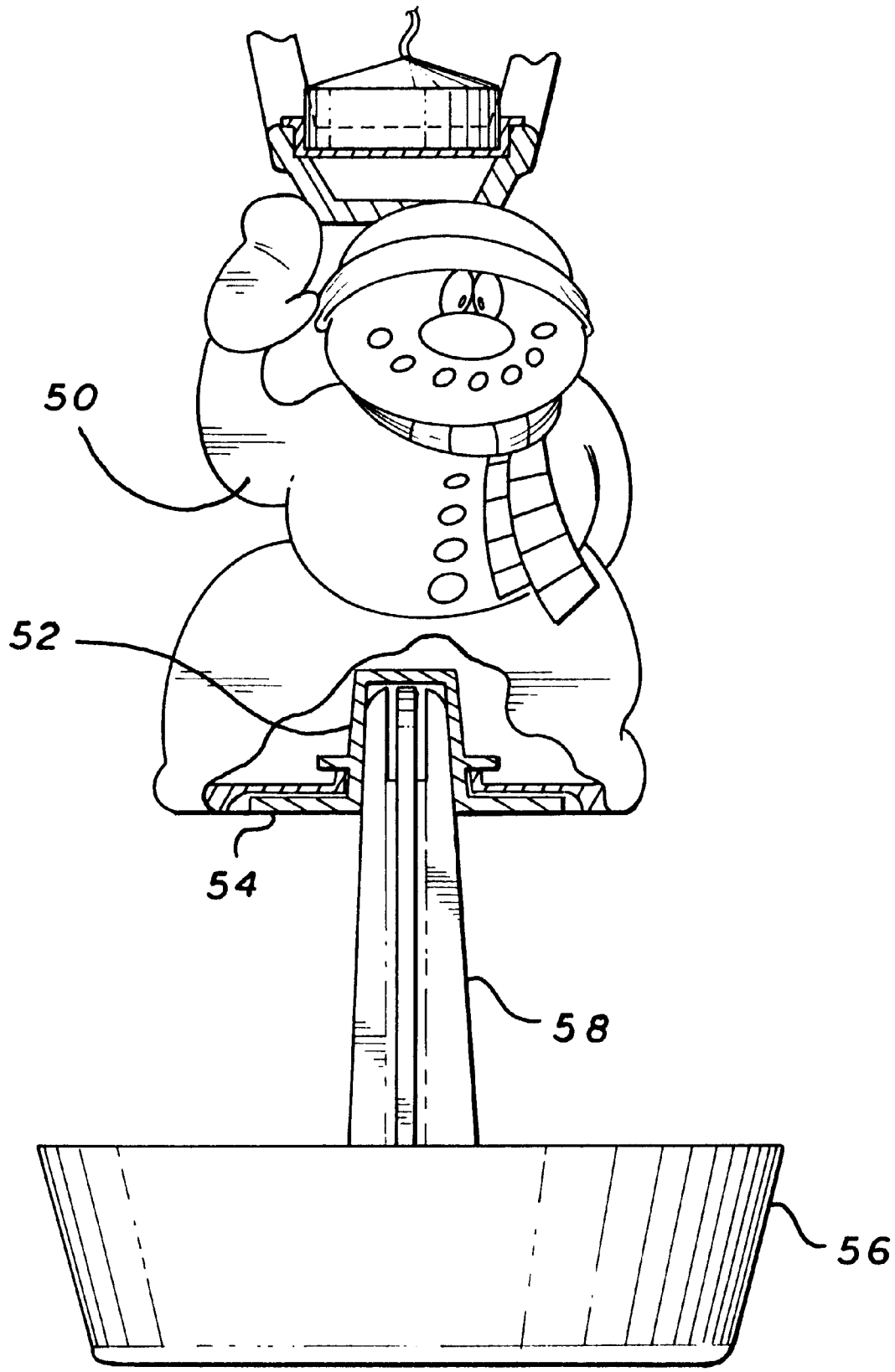
FIG. 5 is a perspective view of another embodiment of the present invention wherein a receptacle is integral with the keepsake.

The receptacle may be integral with a keepsake or may be part of an intermediate support which supports a keepsake. In either case, however, the single container and probe design, or kit, described above may be utilized. Both embodiments will now be described. As shown in FIG. 5, a keepsake 50, in this example, a ceramic character and a small candle, has a receptacle 52 defining a hole in the base 54 of the keepsake as a unitary part of the keepsake. Thus, when the floral bouquet (not shown) has lived out its useful life, and the container 56 and probe 58 are no longer needed, the keepsake 50 is simply removed and the receptacle 52 serves as a permanent part of the base 54 of the keepsake for placement on a flat surface.

Figure 6:
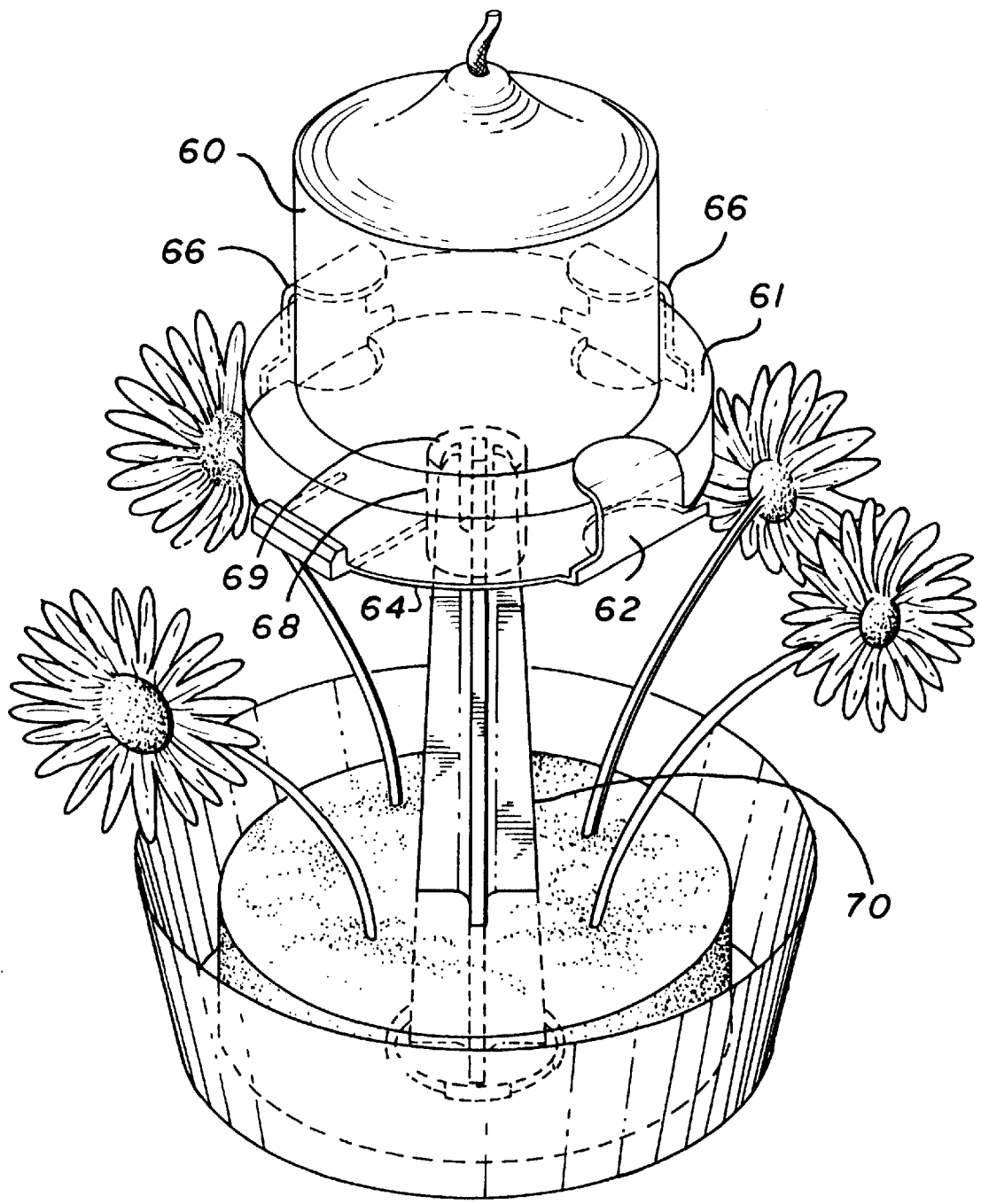
FIG. 6 is a perspective view of the floral bouquet assembly having an intermediate support and a separate keepsake.

FIG. 6 shows a floral bouquet assembled with a keepsake that does not incorporate an integral receptacle. In this example, a large cylindrical candle 60 have a base 61 is supported by an intermediate support 62 having a base plate 64 and gripping members 66 to secure the candle 60 thereto. Projecting normally from the underside of the base plate 64 is a receptacle 68 defining a hole 69. As shown, this receptacle is substantially tubular-shaped and frictionally engages the probe 70 in exactly the same manner as described in the previous embodiments. The base plate 64 has a top surface, a bottom surface and a peripheral edge, and a shape, in this case circular, that supports a keepsake having a base of a similar shape and size. However, it is understood that base plates and mating keepsakes of any of a variety of shapes and sizes are possible. The intermediate support 62 may be made of any suitable material, such as plastic or metal and may be assembled from individual components or molded or cast as a unitary assembly.

In the embodiment shown, the gripping members 66 are connected at various locations around the circumference of the base plate 64, normal to the top surface 14. In this embodiment, wherein the base plate 64 takes the shape of a round disk, two of the gripping members 66 are directly opposite and facing each other and the third is located substantially equidistant between the first two members. Thus, almost half of the circumference of the edge is unobstructed by a gripping member. The unobstructed area provides a point of entry and removal for the keepsake.

To assemble, the candle 60 is simply slid into the retention assembly 62 until its base abuts the three gripping members 66. As shown, these members "hug" the base 61 of the candle 60 and prevents the keepsake from moving in the both the vertical and horizontal positions.

Figure 7A:
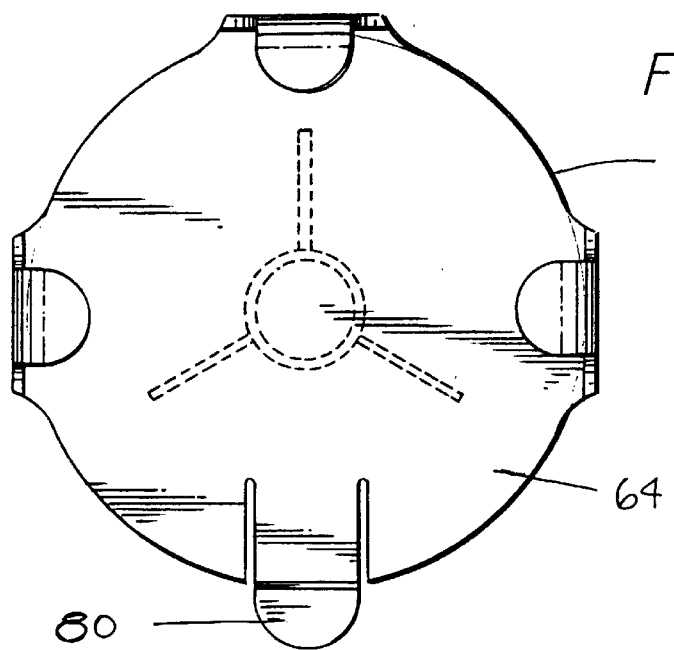
FIG. 7A is a top plan view of the intermediate support shown in FIG. 6.
Figure 7B:
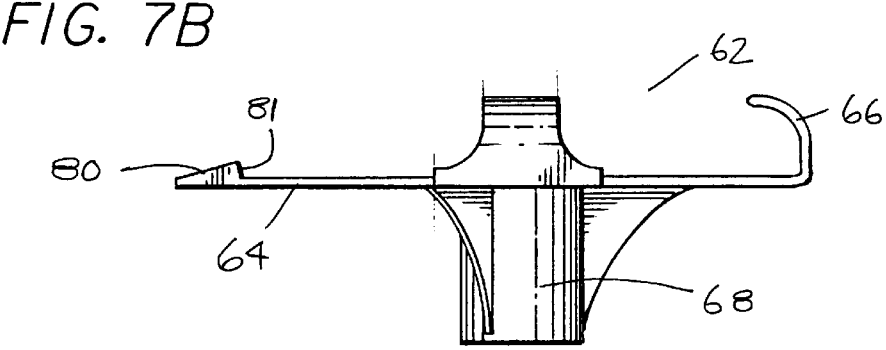
FIG. 7B is a side elevational view of the intermediate support shown in FIG. 6.

As further detailed in FIGS. 7A and 7B, in order to prevent the candle 60 from sliding back out of the intermediate support 62 in the same manner that it was inserted therein, a depressible detente, or protuberance 80 is provided. As shown in FIG. 7B, the protuberance 80 is located at the edge of the base plate 64 directly or approximately opposite one of the gripping members 66. When inserting the keepsake 60 into the intermediate support 62, the base 61 of the keepsake contacts the protuberance 80 and either a lateral sliding force or a downward force deflects it downwardly. When the keepsake 60 is fully inserted, the protuberance 80 snaps back to its original position. At this point, the substantially flat and vertical edge 81 of the protuberance 80 is flush against the base 61 of the keepsake and obstructs its lateral movement in that direction. Thus, the keepsake 60 is safely secured to the retention assembly at four points, in particular, the three gripping members 66 and the protuberance 80. In this way, the final two steps of assembly, namely, snapping the keepsake 60 into the keepsake assembly 62 and safely securing it into place, are accomplished simultaneously, in a matter of seconds, and with practically no effort or skill.

It is understood that the gripping members and protuberance of the intermediate support described herein in detail and shown in FIGS. 6, 7A and 7B comprise but one example of an acceptable means for securing a keepsake without an integral receptacle to a probe. Other intermediate supports, or means that can support a keepsake while permitting easy detachment of the keepsake from the support, are also acceptable. For example, the base of the keepsake can be temporarily adhered to the top surface of the base plate of the intermediate support with any of a variety of adhesives, adhesive tapes, Velcro®, and other temporary connecting means. These options may eliminate the need for gripping members or other support members or may be used in conjunction with such members.

After serving their intended purposes, typically, the molded components of this invention will be discarded along with the old flowers. However, this may not always be the case. An additional feature of this invention is that they, in fact, can be reused repeatedly to create new bouquet/keepsake arrangements. For example, a large quantity of the assemblies of the present invention may be purchased by a florist or a caterer of large affairs for use as reusable centerpieces. At the completion of one event, during which numerous bouquet/keepsake arrangements are displayed, the flowers and keepsakes would typically be removed. The container and keepsake retention assemblies could then be disassembled, cleaned, if necessary, and stored for a future affair. At the appropriate time, The components can then simply be reassembled with new florists' foam, flowers and new (or existing) keepsakes in the manner described in detail above.

Having thus described an exemplary embodiment of the invention, it will be apparent that further alterations, modifications, and improvements will also occur to those skilled in the art. Further, it will be apparent that the present invention is not limited to use of a candle and candle retention device. Such alterations, modifications, and improvements, though not expressly described or mentioned above, are nonetheless intended and implied to be within the spirit and scope of the invention. Accordingly, the foregoing discussion is intended to be illustrative only; the invention is limited and defined only by the various following claims and equivalents thereto.

What is claimed is:

1. A bouquet assembly for creating a display which includes a floral bouquet of cut flowers having flower stalks and a keepsake to be displayed in proximity to the cut flowers as part of the display, the assembly comprising:

a container having a bottom wall and a peripheral wall extending upwardly therefrom defining an open upper end;

a probe connected at a first end to said bottom wall of said container, said probe extending upwardly within said container, said probe having an upper region at a second end opposite said first end;

a body of stalk supporting material within said container, said probe contacting said body of stalk supporting material and holding it in place within said container, said body being penetrated by the flower stalks to support the cut flowers in a desired location outside said open upper end for the display; and a receptacle integral with an intermediate support for the keepsake, said receptacle defining a downwardly open, generally vertical, hole shaped to matingly receive and releasably engage said upper region of said probe, said receptacle being connected to the keepsake in a position such that said probe supports the keepsake in the position of proximity to the cut flowers to form the display;

wherein said intermediate support includes a base plate having a top surface, a bottom surface and a peripheral edge, and at least one gripping member associated with said edge of said base plate, and extending upwardly therefrom for securing the keepsake thereto;

and further including a protuberance located near the edge of said base plate, said protuberance being depressible for permitting the insertion of the base of the keepsake over said protuberance and onto said base plate, and for preventing the base of the keepsake from being slidably removed from said intermediate support absent an external downward force applied to depress said protuberance to, or below, the level of said top surface of said base plate.

* * * * *